Patented Sept. 5, 1922.

1,427,805

UNITED STATES PATENT OFFICE.

JOHN B. HADAWAY, OF SWAMPSCOTT, AND IRA C. BUCKMINSTER, OF BEVERLY, MASSACHUSETTS, ASSIGNORS, BY MESNE ASSIGNMENTS, TO FITZ-EMPIRE DOUBLE PIVOT LAST COMPANY, OF AUBURN, MAINE, A CORPORATION OF MAINE.

BORING MACHINE.

Application filed February 4, 1918. Serial No. 215,402.

*To all whom it may concern:*

Be it known that we, JOHN B. HADAWAY and IRA C. BUCKMINSTER, citizens of the United States, and residing, respectively, at Swampscott and Beverly, in the county of Essex and State of Massachusetts, have invented certain Improvements in Boring Machines, of which the following description, in connection with the accompanying drawings, is a specification, like reference characters on the drawings indicating like parts in the several figures.

This invention relates to boring machines, and in particular to machines for boring holes in lasts. The illustrated machine is designed both for boring spindle holes in lasts and also for boring holes for receiving supporting rivets and hinge mechanism for the lasts.

In the shoemaking art it is customary to support the shoe materials upon the last for operation thereon by various machines, and the last is supported upon the spindle which enters the usual spindle hole. The machine parts which operate upon the shoe materials are for some shoemaking operations located in a definite relation to the shoe, and where shoes of different sizes are presented to the machine it is necessary that the machine elements be adjusted for each variation in size. It has been proposed to make these adjustments with reference to the jack pin or spindle on which the last is mounted in the machine, and it will thus be seen that in order to make the adjustments accurate the spindle holes must be systematically located in all lasts, geometrically or arithmetically relative to one or more characteristics of the last such as its length, width, its heel part or other definite portion, or some fundamental plane or line related to it such as its floor line or joint surface. So far as known, no means has heretofore been provided to effect such location of the spindle holes, or even to insure uniform location of the last spindle holes in lasts of different lengths, or to locate the spindle holes uniformly with the relation to other portions of the lasts in lasts of different sizes, or of different styles or both, or to locate the spindle holes in definite angular relation to any fundamental or base lines or planes related to the lasts.

For this reason it has been found necessary to design existing machines for making boots and shoes with special reference to the variability in position of the spindle holes. As examples, shoe leveling machines and lasting machines are commonly provided with complicated adjusting instrumentalities designed to change the relative positions of various parts of the machine in order that they may be properly positions for operation upon shoes on lasts in which the spindle holes are bored at various angles. This has resulted in making such machines extremely complicated, calling for the employment of numerous devices which would not be required if the spindle holes were bored so as to bear a definite, predetermined relation to other portions of the last.

It is also of importance to bore the holes for the hinge mechanism of a hinge last in definite uniform relation to other portions of the last or to some selected physical characteristic of the last, regardless of its size. In order to secure proper working of the lasts its is advisable that the line of separation between the hinged parts be systematically located in lasts of different sizes, and this necessitates corresponding location of the holes in which the hinge mechanism pins are located.

It is accordingly a very important object of the present invention to provide means for boring holes or effecting other treatment in the same position relative, geometrically or arithmetically, or both combined, to one or more physical characteristics of the work piece, and especially in lasts of different sizes, and whether such lasts are of the same, or of different styles.

In the embodiment of the invention herein illustrated by way of example, positioning devices are employed for insuring the location of the last with reference to a boring tool in such manner as to insure that a hole will be bored in the same relative position in each last which is successively placed in the machine, and that if such lasts are of different sizes the holes will be accurately bored without requiring any adjustment of the machine.

A feature of the invention consists in so positioning the work piece or last relatively to a boring tool that the tool will bore it at a point having the same position relatively to its length whatever this length may be. The relation between the position of the hole and the characteristic (the length) of the last is here a geometrical one. An important feature of the invention further consists in positioning a last relatively to a boring tool so that the bored hole will have in all lasts the same position relatively to that part of the last which substantially corresponds to the foot, irrespective of the extra length due to a pointed toe. This relation is again geometrical, but refers to a part of the last rather than to the whole of it.

In the machine shown, the last is positioned relatively to the boring tool by instrumentalities arranged to move so as to maintain a fixed distance ratio from a point related to a boring tool so that the tool will always occupy the same position relatively to them. These instrumentalities carry fingers adjustable relatively to them, so that the boring tool can be made to occupy a constant position geometrically relatively to a portion of the distance between the fingers (or to a portion of the length of the last engaged); or in another view of the matter, can be made to occupy a position separated by a fixed amount from (i. e., bearing an arithmetical relation to) a geometrical position relative to the length of the last. The relation is here a combined arithmetical and geometrical one.

The production of this latter result is in itself an important feature of the invention. The hinge mechanism of hinge lasts is for reasons of economy made invariable in size for a range of last sizes. It is advisable, however, that these mechanisms be inserted in the same relation to the joint surfaces of the lasts. This relation will be preferably arithmetical since the hinges are of the same length for lasts of different sizes. My invention provides for the boring of a hole for a hinge pin at a fixed distance from a point having a definite relation to the length of the last or to a part of it. By means of my invention a group of holes can be bored which, as a whole, will bear a similar relation to the length of the lasts in which they are bored, or to parts of the lengths.

An important feature of the invention resides in positioning the last with relation to a boring tool so that a spindle hole will be laterally centered in the cone, regardless of the style or shape of the heel. The top of the cone of a last is quite narrow, and careful centering is necessary in order to get the thimble properly embedded in the wood.

Another feature consists in means for so relatively positioning a last and a boring tool that a hole will be bored having a desired angular relation to a base line or surface pertaining to the last. This base line or surface may be the floor line, the line joining the heel seat with the ball upon which the last lies on the measuring "stick," or any desired line or plane related to the last. In the illustrated use of the machine shown the spindle holes are bored perpendicular to the floor line.

I intend that in the claims the words "relative," "relation," or similar words shall be construed broadly, as referring to an arithmetical or geometrical relation, or combined arithmetical and geometrical relation, between a hole or a boring means and one or more selected characteristics of a last, unless a more limited meaning is expressed in the context. The term "arithmetical" connotes addition or substraction of a constant, and would appropriately refer to the placing of a hole at a constant distance from some point as at distances from some point differing by successive constant amounts in lasts of successive sizes. The term "geometrical" refers to proportionality or multiplication by a constant such as, for instance, placing a hole at ¼ the total length of the last from the heel. The placing of a hole at a fixed distance from a point having a geometrical relation to the length of a last, as is done by the machine shown when used as described, would create a relation which could properly be termed a combined arithmetical and geometrical one.

Other features of the invention, including important details of construction and combinations of parts, will be hereinafter more fully described in connection with the accompanying drawings which illustrate a preferred form of the invention, and in which.

Figure 1:
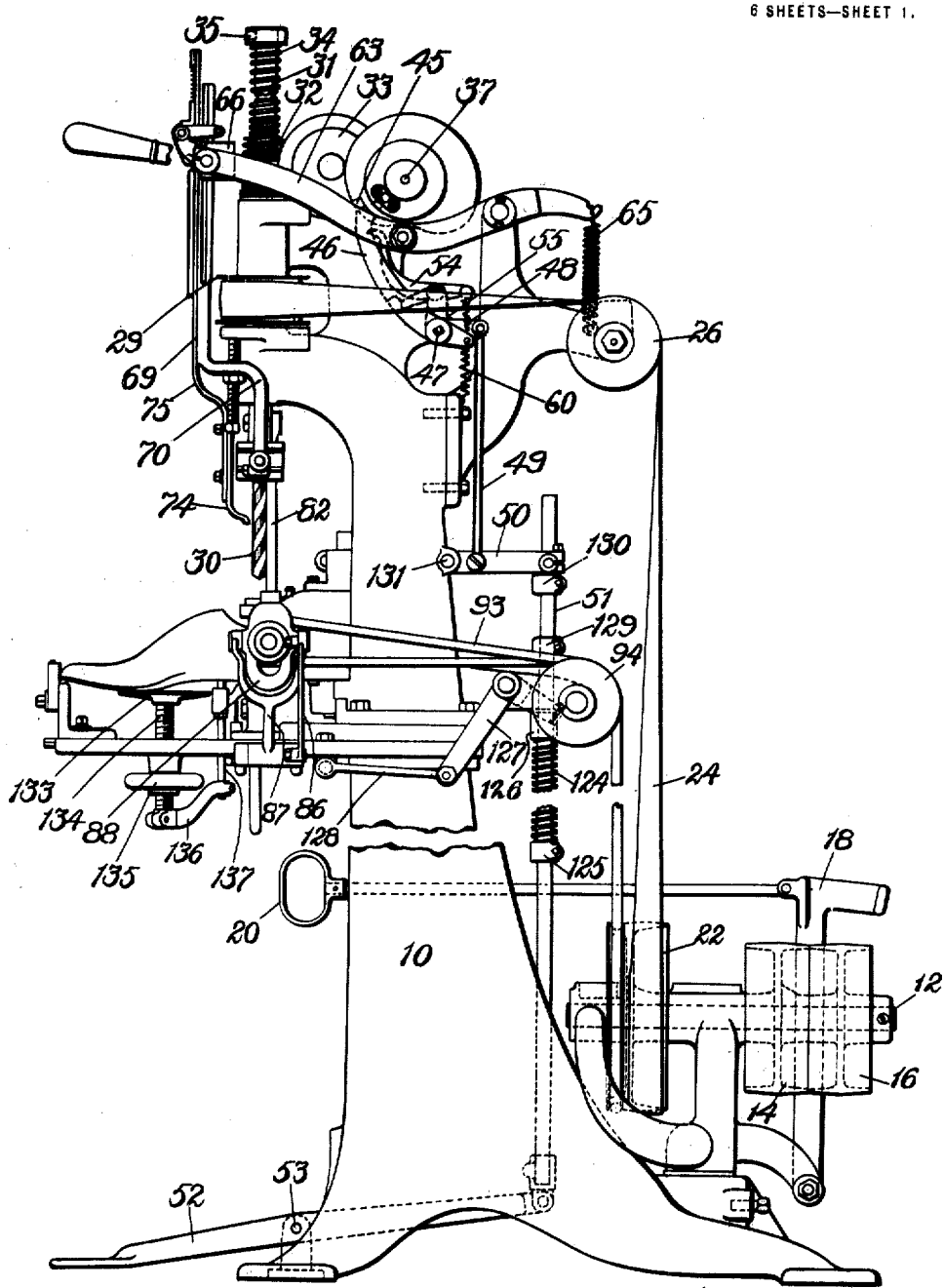
Fig. 1 is a side elevation of the machine.

The frame or pedestal 10 of the machine is provided with a suitable supporting base, and sustains bearings for a main driving shaft 12, which carries tight and loose pulleys 14, 16, upon which may run a belt to receive power from a suitable source. The belt is moved from the tight to the loose pulley, and vice versa, by a belt shifter 18 which is controlled by a rod extending to the front of the machine where it is provided with a handle 20 for manipulation by the operator.

Fastened to the drive shaft 12 is a pulley 22 which carries a belt 24, which belt also passes over two pulleys 26, 26, supported from brackets on the upper part of the frame, said belt additionally passing about a pulley 29 for imparting rotary movement to the boring tool 30. The pulley 29 is splined to a spindle 31 which carries the boring tool, and said pulley also carries a worm 32 which meshes with a worm wheel 33, whose shaft is supported in bearings carried by a bracket rigid with the frame of the machine, the worm 32 being bored to receive the spindle 31 and permit the latter to slide freely therethrough. A spring 34 is mounted on the spindle 31 between the worm 32 and a collar 35 at the upper end of the spindle. This spring will elevate the spindle and boring tool to the upper extremity of their movement when said parts are released from the mechanism which carries them downward.

Figure 3:
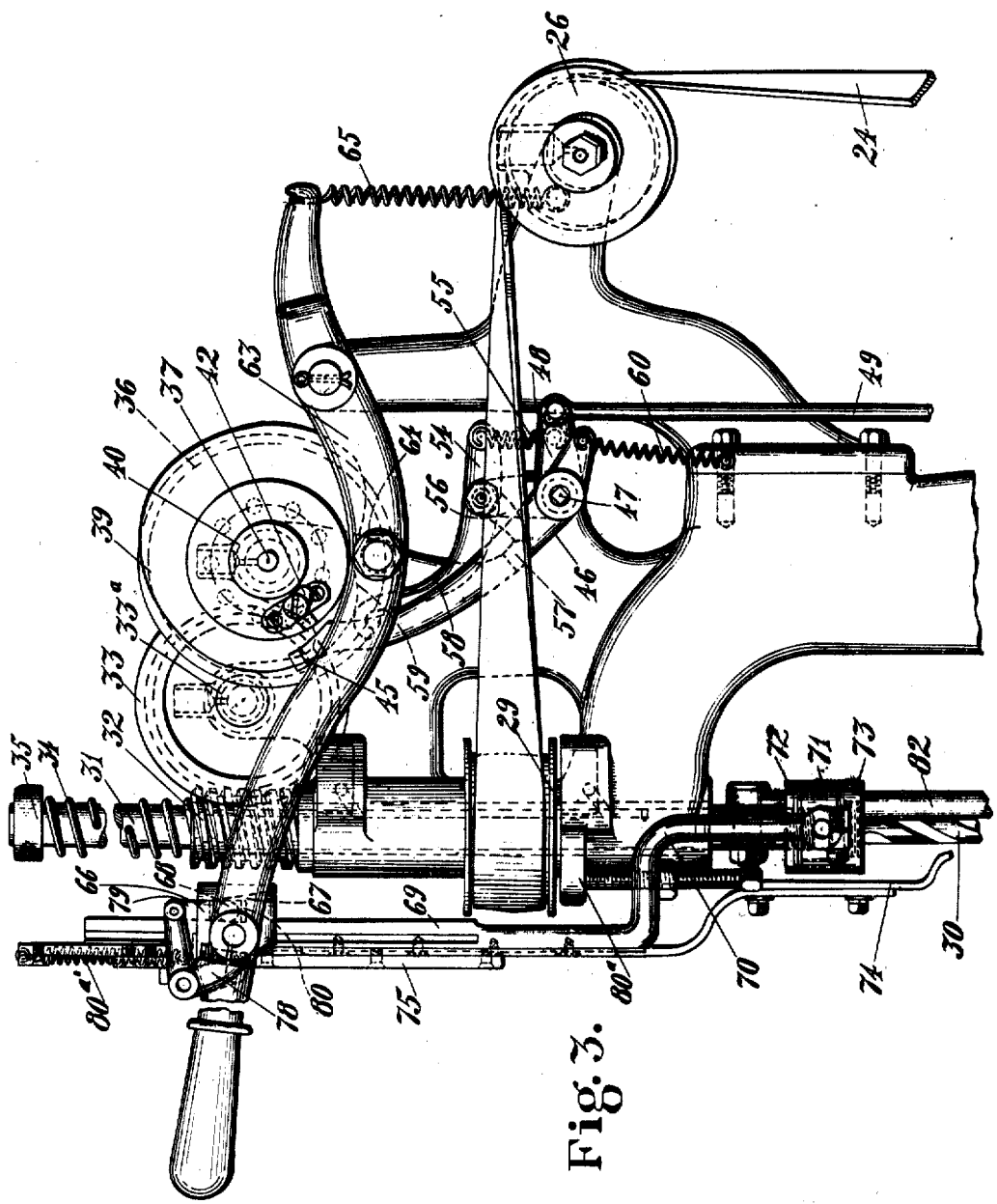
Fig. 3 illustrates certain portions of the machine in side elevation and enlarged.

The worm wheel 33 is provided with a pinion 33ᵃ whose teeth mesh with the teeth of a gear 36, said gear being supported for rotation upon a shaft 37, held rigidly from a projecting bracket of the machine frame. The gear 36 is provided with a hub 38 upon which is rotatably mounted a cam 39. The cam and gear wheel are both retained upon the shaft 37 by a plate 40 and screw bolt 41, which latter is threaded to a hole in the end of the shaft. The cam 39 is provided with an aperture within which slides a spring pressed pin 42 which is adapted to engage one of a series of holes 43 in the gear 36. The cam 39 is provided with a groove 44 to receive a wedge 45 mounted on the end of an arm 46, which is pivoted at 47 to the frame of the machine. The pin 42 normally rests on the wedge 45, the machine being then inactive. The gear 36 revolves continuously while the belt 24 is being driven from the pulley 22, and the cam wheel 39 revolves with the gear 36 when the pin 42 occupies one of the holes 43. This condition is permitted while the arm 46 occupies a position where it will not engage with the pin, as shown in Fig. 3. Mounted on the pivot 47 is a bell crank 48, one arm of which is pivoted to a rod 49, the other end of said rod having connection through a lever 50 and a rod 51 with a treadle 52, fulcrumed at 53 to the base of the machine frame. Another arm of the bell crank 48 has pivotally mounted upon it a three-armed lever 54, one arm of said lever being connected by a spring 55 to the bell crank 48. Another arm 56 of the lever 54 extends toward a lug 57 on the arm 46 with which it is in contact at times, while a third arm 58 extends to the cam 39 and rides thereon when the cam 39 revolves. Upon depression of the treadle 52 the rod 49 is raised, the bell crank 48 is moved contra-clockwise as seen in Fig. 3, and the arm 46 is moved in the same direction through the pressure of the arm 56 on the lug 57. This carries the wedge 45 outwardly beyond the groove 44, and permits the pin 42 to enter one of the holes 43 in the gear 36. The gear will then drive the cam 39 in a contra-clockwise direction, and at the same time that this occurs the arm 58 will ride on the cam 39. The cam 39 will be rotated, and just prior to the completion of its rotation the arm 58 will ride up on a high portion 59 of the cam surface, thereby carrying the arm 56 past the lug 57. The lower end portion of the arm 46 is connected by a spring 60 with a rigid part of the frame and as soon as the arm 56 moves away from the lug 57 this spring will move the arm 46 clockwise until the wedge 45 is moved into the groove 44 so as to be in the path of the approaching pin 42. The pin 42 has an overhanging shoulder 61 extending into the groove 44 and the lower part of the shoulder is wedge shaped, as at 62. When the wedge 45 reaches the wedge 62, the pin 42 will be forced upward and out of the hole 43, thus disconnecting the cam 39 from the gear 36, so that the cam will stop rotating with the pin 42 resting on the wedge 45, regardless of the release of the operating treadle 52, after having completed one revolution.

A split lever 63, pivotally mounted upon a bracket projecting from the frame of the machine, is provided with a cam roll 64 which is maintained continuously in contact with the cam 39 by a spring 65, which connects the inner end of the lever with a fixed point on the machine frame. The outer end of the lever 63 is pivotally connected with a block 66 which has in it a tapering or wedge-shaped slot 67 in which is a roller 68. One side of this roller bears against the inclined side of the wedge slot 67 while the other side of the roller engages a slide 69, which is movable vertically through an opening in block 66. When the outer end of the lever 63 is caused to move downward by reason of the action of the cam 39 against the roller 64, downward movement of the block 66 will cause the roller 68 to be clamped between the wedge surface 67 and the slide 69, thereby gripping the slide and carrying it downward.

On the lower end of the slide 69 are two arms 70, 70 (see Fig. 2) from which are supported a collar 71, through which extend the spindle 31 and boring tool, the spindle having rigid therewith two collars 72, 73, located, respectively, above and below the collar 71, and suitable ball or other anti-friction bearings are interposed between these several collars. The described construction permits the spindle of the boring tool to turn within the collar 71, but prevents longitudinal movement of the spindle and boring tool relatively to said collar. It will therefore be seen that when the slide 69 and its arms 70 are raised or lowered, the boring tool and its spindle will likewise be raised or lowered, at the same time rotation of said tool will be permitted. This construction permits movement of the lever 63 through the cam 39 to carry the slide 69 downward, and with it the boring tool which is thus fed into the cone of the last. A gage 74 is mounted on a slide 75, which latter is supported upon the slide 69, but with capacity for independent sliding movement thereon, by suitable bolts 76 and slots 77. The gage slide 75 has a slot and pin connection with a bell crank 78 which is pivotally supported from the upper end portion of the slide 69, and one arm of the bell crank is connected by a link 79 with a cage 80 which surrounds the roller 68 and acts to force the roller downward into the wide portion of the wedge slot 67 when the bell crank is operated suitably for such purpose. The described downward movement of the cage will release the block 66 from gripping engagement with the slide 69, thereby permitting the lever 63 carrying said block to continue its downward movement in a contra-clockwise direction without effect upon the boring tool. As soon as the boring tool and spindle are thus released from engagement with the lever 63, the spring 34, which was under compression, will be permitted to react and pull the spindle and boring tool upward to the limit of their vertical path, determined by an adjustable stop screw 80ᵃ, carrying also with said parts the arms 70, and the slide 69 and elements supported thereby. A spring 80ᵃ' connects the slides 69 and 75 and tends to hold the slide 75 in its lowermost position relative to the slide 69. The vertical distance between the lower ends of the stop 74 and tool 30 is approximately equal to the depth of the hole bored in all lasts. Adjustment of the stop on its slide 75 will regulate this depth.

One of the arms 70 is provided with a lug 81 which, through a slot and clamping bolt, has adjustable connection with one end of a rod 82. The rod 82 extends downwardly beside the last, Fig. 2, and is pivotally connected with one arm of a lever 83, which is fulcrumed at 84 to a rigid bracket. The lever 83 has a short arm 85, to which is pivoted a link 86, equal in length and parallel with the third arm 87 of the lever. The arm 87 is bifurcate, and carries a yoke 88 pivoted at its upper end. The yoke has an arm, parallel and equal in length with the arm 85, pivoted to the link 86. The yoke 88 will therefore always be maintained vertical. It has a vertically sliding but horizontally fixed connection with a spindle 89, supported slidably in bearings 90, and carrying at its inner end a boring tool 91 (see Fig. 2). A pulley 92 is splined to the spindle 89, and said pulley is driven by a belt 93 which passes over idlers 94 and is received in a groove of the driving pulley 22, through which means the drill 91 is rotated.

It will be apparent that when the lever 63 is moved downwardly by the cam 39 to carry down the member 69, the lever 83 will force the spindle 89 and drill 91 inwardly, feeding the drill sidewise into a last. While I have herein shown but a single drill so placed as to make the small rivet hole which is placed about one-half inch behind the spindle hole, it will be apparent that any number of drills may be simultaneously operated by movement of the lever 83, with the operation of the tool 30 for boring the spindle hole. In the event that a plurality of drills, such as 91, are employed, these may be arranged to drill all the rivet holes for supporting the hinge members of a hinged last, at a single operation. It will also be seen that such holes will have a predetermined relation to the spindle hole which is bored by the tool 30.

The frame of the machine supports a horizontal bed or table 95, herein shown as having a guiding groove which receives a slide 96, such slide being mounted for movement on the table in a direction parallel to the axis of a last which is supported in position to have its spindle hole bored. The slide 96 carries, at or near its front end portion, a clamping finger 97 which has a horizontal foot portion 98 provided with a slot 99, and a clamping screw 100 is threaded to the slide 96 and adjustably secures the finger 97 in position on said slide, for a purpose which will be later described. As shown, the finger 97 is provided with a laterally extending upper portion 101 which is secured by a clamping bolt 102 to the body portion of the finger for vertical adjustment thereon.

Figure 4:
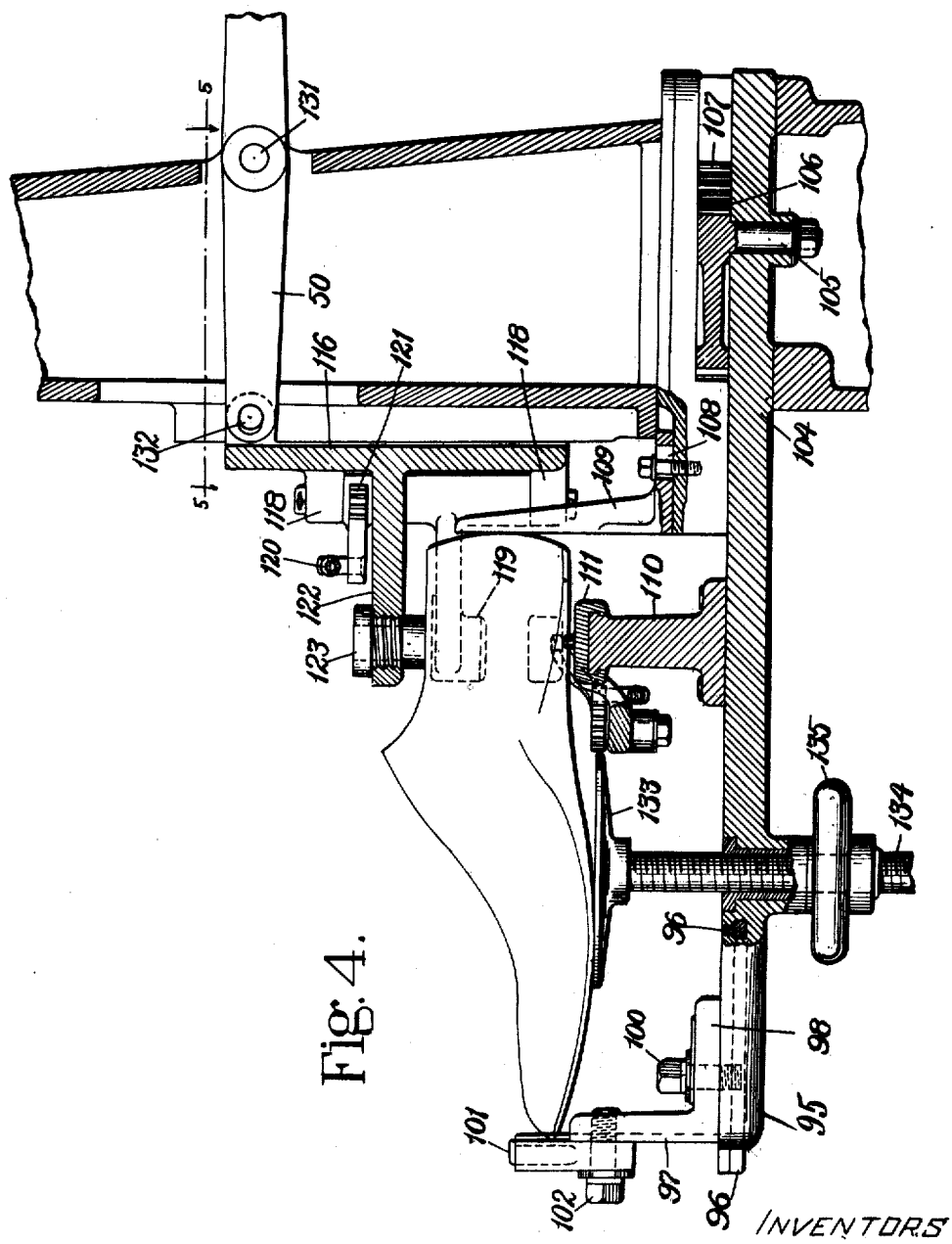
Fig. 4 is an enlarged view, partly in longitudinal section and partly in side elevation, illustrating the last supporting and positioning devices.

The slide 96 has at its rear end portion a rack 103 which meshes with a segment gear 104, carrying a stud 105 which pivots in an aperture through the table 95. The segment 104 carries a pinion 106 which meshes with a rack 107 mounted upon a second slide 108, supported for movement on the table 95 in a direction parallel with the path of movement of the slide 96. As the two racks 103 and 107 are geared together by the pinion 106 and the segment 104, they will move simultaneously in opposite directions, but at different speeds proportional to the pitch diameters of the pinion and segment. If the mechanical design of the machine were such as to permit them to be run toward each other until they met, they would move toward and from this "meeting point" with a velocity ratio equal to the gear ratio, and their distances from this point would have the same ratio. The slide 108 carries an adjustable heel gripping finger 109, as shown in Fig. 4, and as there shown the gripping fingers 97 and 109 are arranged when moved toward each other to grip a last by engagement therewith at the toe and heel end so as to position the last properly with reference to the boring tool 30. It will be clear that if a number of lasts of the same style, and, therefore, of the same general shape are considered, these lasts when the two fingers 97 and 109 are moved up into engagement with their toes and heels will each present the same relative point in the upper surface of the cone at the "meeting point" at which the boring tool may be located. With the gearing ratio illustrated in Fig. 4, this point is approximately one-sixth of the distance from the heel to the toe, and in all sizes of lasts the same point, one-sixth of the distance from the heel to the toe, will then be presented to the boring tool so that the holes when bored will occupy the same position relative to the length of the last.

Resting upon the table 95 is a pedestal 110, the upper end portion of which is shaped to guide, transversely of the last, a slide 111, such slide being thus adjustably movable in a direction transversely of the path of movement of the slides 96 and 108. The slide 111 supports, by pivots 112, two clamping fingers 113 which are provided with intermeshing gear teeth 114 to insure uniformity of their movements in opposite directions. A spring 115 has its opposite ends connected with projecting lugs which extend from the clamping fingers 113 and acts to yieldingly hold said fingers in engagement with the side portions of a last. The curved ends of the fingers 113 are designed to engage the side portions of the heel of the last, and as said fingers are geared together they will act to center the lower heel portions of all lasts with uniformity upon the slide 111. In positioning a last, the operator introduces the last between the fingers 113, heel end first, thus forcing the two fingers apart, and said fingers thereupon center the bottom portion of the heel, and at the same time the operator, by pressing on the last, causes the slide 111 to move laterally to the right or to the left in order to roughly center the cone of the last under the boring tool.

Figure 5:
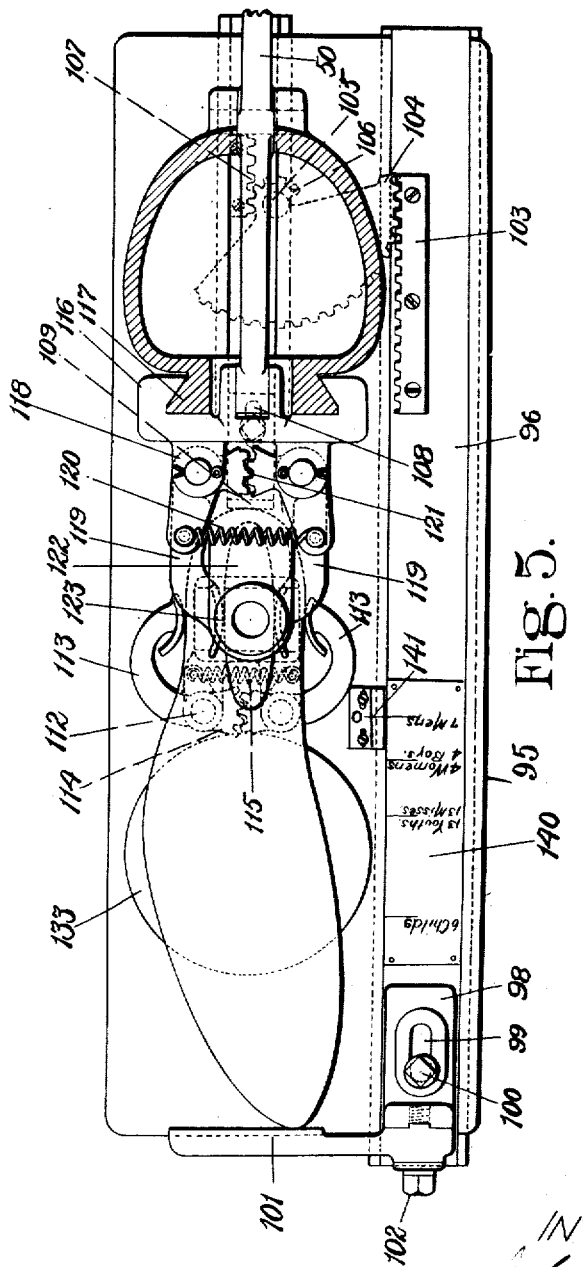
Fig. 5 is a sectional plan view, on the line 5—5, Fig. 4.
Figure 6:
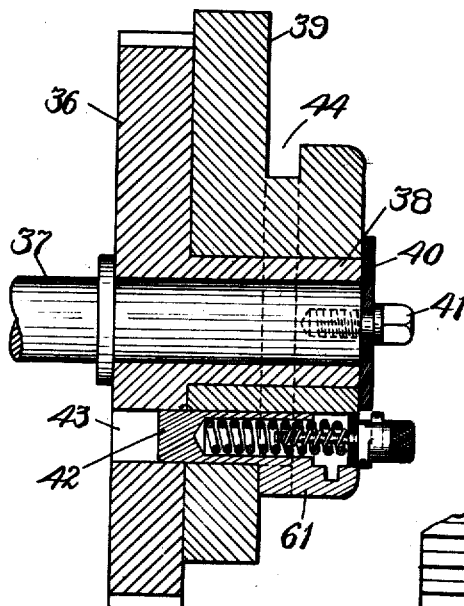
Fig. 6 is an enlarged view in vertical transverse section of the clutch, on the line 6—6, Fig. 3.
Figure 8:
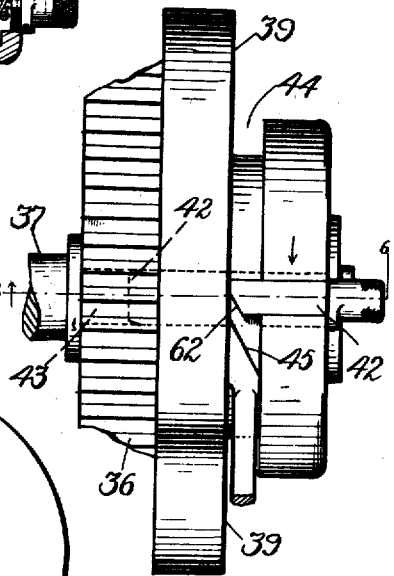
Fig. 8 is a view in side elevation of the same parts.
Figure 7:
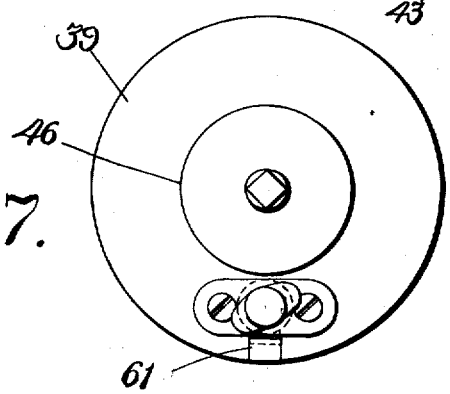
Fig. 7 is a view, in front elevation, of the same parts.

A sliding plate 116 is provided with a dove-tailed guideway which moves vertically upon dove-tailed lugs 117 projecting from the side portion of the frame 10, as shown in Fig. 5. The plate 116 is provided with two forwardly projecting pairs of lugs 118 to which are pivoted fingers 119 having curved outer ends which are arranged to engage opposite sides of the cone of the last. Said fingers are connected by a spring 120 which serves to hold them yieldingly in clamping engagement with the last, and intermeshing gears 121, carried by the fingers, compel uniformity of their movements in opposite directions.

The plate 116 is also provided with a horizontal portion 122 into which is threaded a hollow bushing 123 which is coaxial with the boring tool, and serves to center and guide said tool accurately to that point in the cone of the last at which the spindle hole is to be bored. The bushing 123 is forced down upon the upper portion of the cone of the last at the same time that the fingers 119 are caused to descend and grip the cone of the last, and the bushing firmly clamps the last against the slide 111 after the fingers have centered the last by moving the slide 111 the requisite amount as they descend. The boring tool, when it descends, passes through the bushing to bore its hole.

The gear ratio of the gears 104, 106 will be ordinarily determined by the position in which it is desired to bore spindle or hinge pin holes. Speaking now of the spindle hole, assume that the pitch radii of the gears have a ratio of 1:5, and that the fingers 101 and 109 are in their zero position of adjustment, that is, adjusted for a last of standard length. The bushing 123 is preferably located over the meeting point where the fingers 101 and 109 would come together if they moved toward each other at velocities proportional to 5 and 1, respectively, until they came in contact. Conversely, they will move away from this point with the same relative velocity, and the boring tool 30 will always enter a last gripped between the fingers, at $\frac{1}{6}$ the distance from the heel to the toe.

The two slides 96 and 108 are operated by the treadle 52, having connected thereto the rod 51, upon which is a spiral spring 124, confined between a fixed collar 125 and a sliding collar 126. The collar 126 acts against one arm of a bell crank 127 whose other arm is connected through a pivoted link 128, with the slide 96. When the treadle is actuated to move the treadle rod 51 upward the spring 124 acts against the collar 126 to press the rear end of the bell crank upward, thereby actuating the slide 96 with finger 97, and through the rack and gear connections, moving the slide 108 carrying the gripping finger 109, the gripping fingers being thus moved towards opposite ends of the lasts, but at different speeds. When the last is thus gripped, further movement of the rod 51 will cause the spring 124 to yield.

The rod 51 is provided with a collar 129 which when the rod is moved in the opposite direction reversely operates the bell crank 127 for moving the slides 96 and 108 apart to release the last. This operation takes place when the operator releases the treadle 52. The treadle rod extends upward and carries a third fixed collar 130 which is arranged to engage the outer end of the lever 50. The lever 50 is fulcrumed to the machine frame at 131, and extends through the hollow portion of said frame, as shown in Figs. 4 and 5, being connected through a slot at its inner end with a pin 132 on the plate 116. When, therefore, the treadle 52 is depressed to move the slides 96 and 108 toward each other for gripping a last and positioning it longitudinally, the plate 116 will be operated downwardly to cause the gripping fingers 119 to engage the cone of the last and center it transversely, and the bushing 123 will then engage the top of the cone and clamp the last against vertical displacement. The longitudinal centering of the last is effected before the last is clamped by the bushing, the spring 124 yielding to permit movement of the rod 51 after the last is gripped by the fingers 97 and 109.

The lever 50 is connected by the rod 49 with the bell crank 48 by which the wedge 45 is actuated to initiate the downward movement of the boring mechanism. Hence the operator by the simple act of depressing the treadle 52 positions the last, both longitudinally and laterally, with reference to the boring mechanism, clamps the last in position, and causes the boring mechanism to operate for boring the holes in the last as thus positioned.

Figure 2:
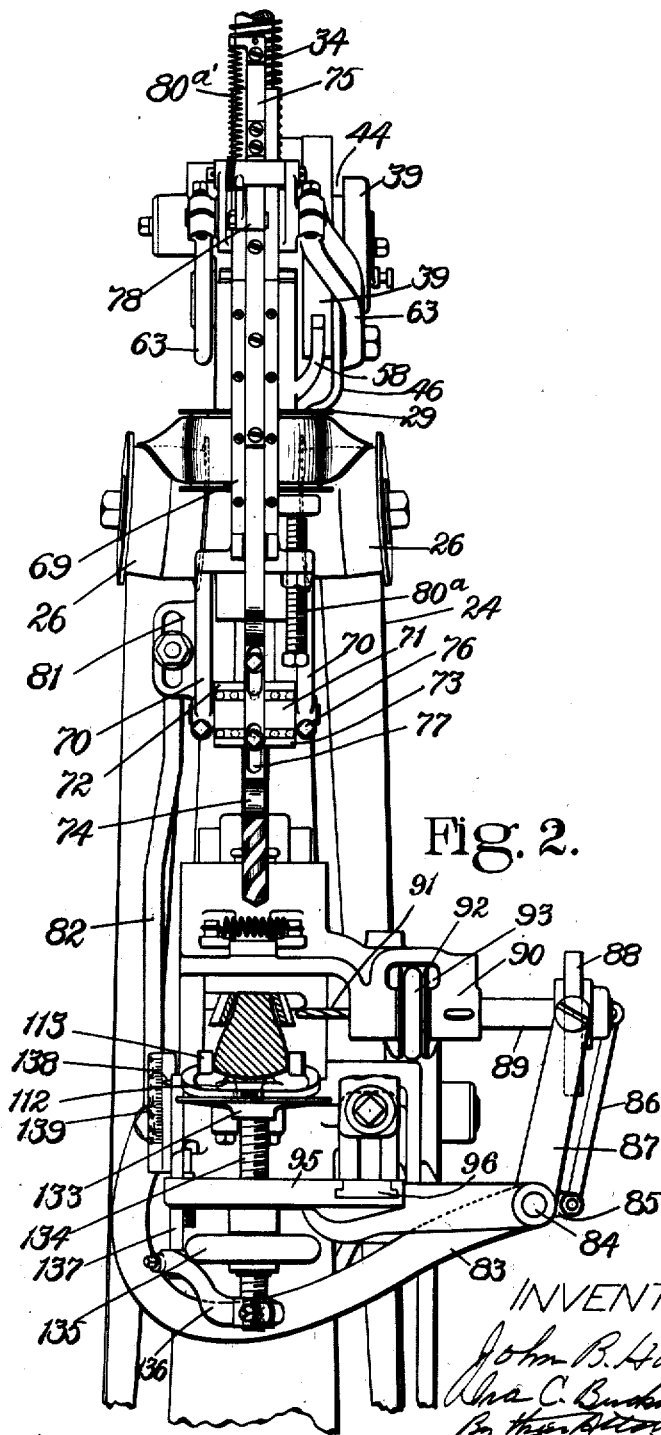
Fig. 2 is a front elevation of the upper portion thereof.

It is highly desirable that means be provided to support lasts in position for the operation of the boring tool which is capable of adjustment, so that lasts of different sizes having different degrees of rise at the heel can be tilted into a desired angular relation to the boring tool, to the end that the spindle holes will always be bored at a desired angle to a base line of the last. In the illustrated embodiment of this invention, such result is accomplished by mechanism which is best shown in Figs. 1, 2 and 4 of the drawings. The forepart of the last is supported by a table 133 sustained upon a screw 134, which passes through an aperture in the table and is capable of being adjusted by a hand wheel 135 having threaded engagement with the screw, and through which the table may be suitably raised and lowered. The stem 134 carries an arm 136 from which extends a rod 137 which is provided with a pointer 138 moving along a scale 139, which is fixed relatively to the pointer. Successive sizes of lasts differ from each other in the rise of the heel by $\frac{1}{15}$ of an inch, and the subdivisions on the scale 139 will enable the operator to adjust the elevation of the table 133, so that the last which is about to be bored may be leveled or tilted, by rotating the hand wheel 135 properly to locate the pointer 138 opposite that subdivision of the scale which indicates the correct position for such last. The "base line" in the illustrated use of the machine is the floor line of the last.

The invention contemplates such adjustment of the last positioning means which will enable lasts of different styles to be bored, so that the spindle holes will all be in the same relation to their foot corresponding portions. If a number 7 last, for instance, is taken from each of two different sets or styles of last, they may of different lengths, as one may be a plain-toed form and the other a pointed-toed form. It is often advisable to drill the spindle hole of each of these lasts at substantially the same distance from the heel. In order to effect the corresponding adjustment of the last positioning mechanism the gripping finger 97 is moved longitudinally along the slide 96, and to be sure that the proper adjustment is made for any given style of last, resort may be had to a scale, such as 140, on the slide 96, and an adjustable zero mark 141 on the table 95 as shown in Fig. 5. The scale indicates the several different model sizes of the lasts which are to be bored, as for example, 6 childs, 13 youths, 13 misses, 4 womens, 4 boys, 7 mens. The zero mark on the table will come opposite the mark "7 mens" on the slide 96, when the number 7 last of standard length is gripped between the fingers 97 and 109. If a number 7 last other than that of a standard length is to be bored in the machine the slide will be so moved that the number 7 mark comes opposite the zero on the table 95, and the gripping finger 97 is adjusted by means of the screw 100 until it just clamps the non-standard last tightly between itself and the finger 109. The positioning mechanism will then be adjusted for boring spindle holes in all lasts of that particular style, regardless of their length. When a different style of last is to be bored the finger 97 must again be adjusted and the adjustment can be quickly made for any style of last by simply adjusting the slide 96 so that the mark corresponding to the model size of that last on the scale 140 comes opposite to the zero mark on the table, and then moving the finger 97 so that its distance from the finger 109 is equal to the length of the model last in question.

The graduations on the scale 140 may preferably be located so that they all correspond to the standard or "stick" lengths of the models to which they relate, with the finger 101 so adjusted as to meet the finger 109 under the center of the bushing 123 as above described, if the gearing were operated to cause them to grasp a last of zero length. With the finger 101 in other adjustments, corresponding to styles of lasts longer or shorter than the "stick" length, the spindle hole will not be bored $\frac{1}{6}$ of the distance from the heel to the toe, but will be bored the same distance from the heel in all lasts of the same marked size, regardless of their style or actual length. The rear parts of lasts of widely varying toe styles are almost identical, and it will be advantageous, for many purposes, to locate holes from the standpoint of the rear part, rather than of the last as a whole.

For example, assuming the standard #7 to be about $10\frac{1}{2}$ inches long, which is approximately accurate, the #10 will be $11\frac{1}{2}$ inches long and a mechanism arranged as described and having a 5:1 gear ratio will place the spindle hole $\frac{11\frac{1}{2}}{6} = \frac{23}{12}$ inches from the heel end of it. Suppose now that we have a pointed toed last, the #7 of which is 11 inches long. The #10 of this style will be 12 inches long. We are here regarding it as desirable to locate its spindle hole at the same distance from the heel as in the standard #10. The finger adjustment described will move the finger 101 forward $\frac{1}{2}$ inch in order to grasp the pointed #7. The meeting point of the fingers is thereby moved forward $\frac{1}{6} \times \frac{1}{2} = \frac{1}{12}$ inch. This meeting point will come at $\frac{1}{6} \times \frac{1}{12} = 2$ inches from the heel of the pointed #10 and the boring tool will be located at $2 - \frac{1}{12} = \frac{23}{12}$ inches from the heel of the last, which is the result desired.

Consideration of this matter from another point of view brings out another important feature of the invention. The meeting point is always located at $\frac{1}{6}$ of the distance from the heel to the toe. Moving the meeting point forward a distance $d$ will locate the boring tool such distance $d$ behind a point which is $\frac{1}{6}$ of the distance from the heel to the toe in all lasts. The application of this to the boring of hinge pin holes in lasts is obvious. Such a relation between tool and work is a combined arithmetical and geometrical one. It may be said to have a geometrical (and an arithmetical) component, and the former term may be applied broadly to a relation which is purely geometrical, the geometrical "component" amounting to the whole.

The adjustment of the finger 109 together with that at 100, or either of them alone is mechanically equivalent to an adjustment of the bushing 123, and therefore permits the adjustment of the point of bore relatively to the length of the last. If all lasts were of standard length, the adjustment at 100 alone could be used for this purpose. The zero mark 141 can be adjusted to meet the necessity created by any such change. Such an adjustment could be used, for example, if it were necessary to bore the horizontal hole at a fixed proportion of the length of the last from the heel.

For example, suppose the horizontal drill is $c$ inches behind the vertical drill. Moving the finger 109 a distance $\frac{6}{5} c$ inches backward will locate the meeting point over the horizontal drill, and the machine will then bore the horizontal hole at $\frac{1}{6}$ the distance from the heel to the toe in all lasts. If, as before, we are dealing with a last with a half inch extension, the front finger may be also advanced $\frac{1}{2}$ inch, which will locate the hole in the same place as in the standard last, notwithstanding the extension.

From the foregoing description, it is believed that the use of the disclosed mechanism embodying the present invention will be apparent. Preliminary to boring a last the operator makes the necessary adjustment of the slide 96 for the particular size of last to be bored as above explained, and secures the finger 97 in adjusted position by the set screw 100. The last is placed on the table 133 and slide 111 by pushing it in, heel end first, between the fingers 113, and is roughly centered beneath the bushing 123 by lateral movement of the slide 111. In order to start the machine, the handle 20 is grasped and the belt shifter 18 moved for transferring the belt from the loose to the tight pulley, which effects rotation of the driving shaft 12. Rotation of the pulley 22 will, through the belts 24 and 93, impart rotative movement to the boring tool 30, and the drill 91.

The operator then steps on the treadle 52, raising the rod 51, and, through the spring 124, sliding collar 126 and the bell crank 127 causing movement of the slide 96 from left to right, see Fig. 1. The fingers 97 and 109 will thereby be caused to grip the last at its opposite ends and to move it longitudinally in proper position with relation to the boring tool. After the gripping fingers 97 and 109 have engaged the last, further movement of the slide 96 will be prevented and the spring 124 will yield and permit a continued movement of the rod 51. The fixed collar 130 will engage the lever 50, which will move downward the plate 116, causing the fingers 119 to engage the sides of the cone of the last and center it laterally, following which the bushing 123 will engage the last and clamp it against the slide 111. The contact of the bushing with the cone of the last stops the movement of the treadle 52 in the machine shown.

The movement of the rod 51 will effect contra-clockwise turning of the arm 46, thereby removing the wedge 45 from the locking pin 42 and permitting the pin to enter one of the holes 43, following which the cam 39 will rotate causing the descent of the outer portion of the lever 63, and as a consequence the spindle 31 and boring tool 30 will be moved downwardly to bore the spindle hole in the last. The parts are so adjusted that the release of the pin 42 from the wedge 45 takes place just prior to the contact of the bushing 123 with the cone of the last. The gage 74 having previously been properly adjusted on the slide, when the hole has been bored to the depth predetermined by the adjustment of such gage the latter will effect disengagement of the block 66 and slide 69, releasing the boring spindle and its tool from connection with the lever 63, and thus permitting the spring 34 to raise the spindle and tool to the upward limit of their movement. At the same time that the arms 70 move downward with the spindle 69 the lever 83 is actuated to move the spindle 89 laterally toward the side of the last, thus feeding the drill 91 in a direction to cause it to bore the hole for the supporting rivet; or, in the event that a plurality of drills were employed, these would be moved inward simultaneously to drill the necessary holes for hinge supporting rivets, as desired.

After the last-positioning devices and tool advancing mechanisms have been actuated, and the holes have been bored in the last, the operator steps off of the treadle, thus permitting the rod 51 to move downwardly for restoring the several parts to their original positions. The release of the treadle, however, is not necessary to the completion of the boring operation, as after the bell crank 48 is moved contra-clockwise through connections from the treadle, and the arm 58 is moved in the same direction, the end of this arm rides upon an elevated portion of the periphery of the cam 39 and remains there until the latter has nearly completed one rotation, when the arm will enter the depressed portion 59 of the cam. During the time that the arm is riding upon the elevated portion of the cam the wedge 45 will be held out of the path of the pin 42, thus permitting the cam to rotate with the gear 36 and to continue its action upon the arm 63 forcing down the boring tool. When the arm 58 encounters the high point 59 of the cam the arm 56 will be moved away from the lug 57, thus permitting the wedge to fall into the groove 44, and to raise the locking pin 42 out of the hole 43 and stop the rotation of cam 39. The action of the cam upon the arm 63 is therefore continued through one complete rotation, when such action automatically ceases.

Having thus described our invention, what we claim as new and desire to secure by Letters Patent of the United States is:—

1. A machine of the class described having, in combination, boring means, and positioning mechanism, constructed and arranged to effect between the boring means and successive pieces of work which differ in a dimension a uniform relation determined by a definite fraction (other than ½) of the said dimension.

2. A work positioning means comprising members constructed and arranged to move toward one another at different speeds to grasp a work piece in a dimension whereby articles differing in said dimension may be positioned with a point determined by a fraction (other than ½) of said dimension registering with a predetermined point between said members.

3. A machine of the class described having, in combination, boring means, and means for presenting lasts to said means, said parts being arranged for relative movement and including contacting members for automatically positioning lasts of different sizes in the same non-central geometric relation to said means.

4. A machine of the class described having, in combination, boring means, and means for presenting work pieces to said means, comprising parts arranged for relative movement and including members for automatically positioning pieces of work of different lengths in the same longitudinal non-central geometrical relation to said boring means.

5. A machine of the class described having, in combination, boring means, and means for presenting work pieces differing in a certain dimension to said means, said parts being arranged for relative movement and including positioning members operable to position a portion of a work piece, taken in relation to the said dimension thereof, in the same non-central, geometrical relation to said means considered in relation to the same dimension, irrespective of variations in the remainder of the work piece in the said dimension.

6. A machine of the class described having, in combination, boring means, and means for presenting lasts to said means, said parts being arranged for relative movement and including contact members operable to automatically position that portion of a last which corresponds generally to the foot which the last is to fit in the same longitudinal geometrical, non-central relation to said means, irrespective of the style of the last.

7. A machine of the class described having, in combination, boring means, actuating means therefor, and means operable to caliper the work and to locate it in such position relatively to the boring means that the holes bored by said means in successive pieces of work will be in the same relation to all the work pieces, said relation having a geometrical and an arithmetical component in the same dimension.

8. A machine of the class described having, in combination, a plural boring means operable to form the thimble holes and lateral pin holes in lasts, and means for supporting the lasts in the same geometrical relation to the boring means, irrespective of the sizes of the lasts.

9. A machine of the class described having, in combination, a boring means operable to form a set of hinge pin holes in lasts, and clamping members operable to support the lasts in the same non-central geometrical relation to the boring means, irrespective of the styles or sizes of the lasts.

10. A machine of the class described having, in combination, a boring tool, actuating means therefor, and members movable at different speeds to contact with a last operable to position lasts of the same style but of varying sizes in the same non-central geometrical longitudinal relation to the tool, and means contacting with the cone of the last and operable to center it under the tool, irrespective of the shape of the heel.

11. A machine of the class described having, in combination, a boring tool, and abutment members dependently differentially movable and operable in position lasts having a variable characteristic in the same geometrical relation to the tool as regards that characteristic.

12. A machine of the class described having, in combination, a tool, actuating means for the tool, members dependently movable at uniform but unequal velocities to contact with lasts varying in dimensions between the points of contact of said members to position the lasts in the same non-central geometrical relation to the tool, and a pair of members movable downwardly to wedge over the cone to position the lasts all in the same transverse relation to the tool.

13. A machine of the class described having, in combination, a boring tool, actuating means therefor, means for moving lasts into the same non-central geometrical longitudinal relation to the tool, means for positioning the lasts in the same transverse relation to the tool, and last clamping means actuated with said transverse positioning means.

14. A machine of the class described having, in combination, a tool, actuating means for the tool, members dependently movable at uniform but unequal velocities to contact with work pieces varying in dimensions between the points of contact of said members to position the work pieces in the same non-central geometrical relation to the tool, and a pair of members oppositely movable transversely to the movement of the first-named members to position the work pieces all in the same transverse relation to the tool, and a holding member operated in time relation to one of the sets of positioning members to clamp the work piece in position after it has been arranged by the positioning members.

15. In a machine of the class described, boring means, mechanism for longitudinally positioning lasts of different style characteristics in the same non-central geometric relation to the boring means as regards their foot-corresponding portions and means for compensating for variations in toe extension without disturbing the said relation.

16. In a machine of the class described, boring means, and mechanism for positioning lasts of varying sizes with their rear portions in the same longitudinal non-central geometric relation to the boring means.

17. In a machine of the class described, boring means, and work positioning means comprising movable members operable to maintain a fixed distance ratio other than unity from a point, there being provision for adjustment between the boring means and the said point.

18. In a machine of the class described, boring means, and last positioning means comprising movable members operable to maintain a fixed distance ratio other than unity from a point, the members each being connected with a last feeling finger constructed and arranged to engage the last at an end to locate the last non-centrally relatively to the boring means.

19. In a machine of the class described, boring means, and last positioning means comprising movable members operable to maintain a fixed distance ratio other than unity from a point, the members each being connected with an adjustable last feeling finger.

20. In a machine of the class described, boring means, and mechanism for positioning the work piece relatively to the boring means comprising fingers operable to approach or recede from a point between them at non-uniform velocities and to grasp the work piece to locate it in a geometrical relation other than that of centrality relatively to said boring means.

21. In a machine of the class described, boring means, and mechanism for positioning a last relatively to the boring means comprising fingers constructed and arranged to grasp the last and movable relatively in such manner that the ratio of their distances from a point is constant, and different from unity, said point being adjustably related to the boring means.

22. In a machine of the class described, a boring tool, and means for positioning a last relatively to said tool comprising feelers connected for movement toward and from opposite ends of the last at different speeds to locate the last in geometrical relation to the boring tool.

23. In a machine of the class described, a boring tool, a support, slides on said support, toe and heel gripping devices on said slides, gearing connecting said slides constructed to cause movement of said devices toward and from the ends of a last at different speeds to locate its foot-corresponding portion, irrespective of its size, in the same geometrical relation to said tool, and means for adjusting the position of one of said devices relatively to the other to preserve the geometrical relation, irrespective of differences in the style of lasts.

24. In a machine of the class described, a boring tool, means for positioning lasts of varying sizes in the same longitudinal relation to said tool comprising gripping devices for engaging the end portions of a last, connecting mechanism to cause said devices to approach the last at different speeds to locate the foot-corresponding portion of the last in geometrical relation to the tool, a slide supporting one of said devices, a scale on said slide having subdivisions indicating different styles of lasts, means for relatively adjusting the gripping devices for different styles of lasts, and means carried by the slide support to indicate on the scale the style of last for which the gripping devices have been adjusted.

25. In a machine of the class described, a boring tool, differentially moving contact members for automatically uniformly positioning lasts of the same style in the same longitudinal geometrical relation to said tool, and positioning members automatically calipering the cones of the lasts for positioning said lasts in the same transverse relation to said tool.

26. In a machine of the class described, a boring tool, calipering members arranged for simultaneous differential movement for automatically uniformly positioning lasts in the same longitudinal relation to said tool, stops for positioning said lasts in the same transverse relation to said tool, and a single member for operating both of said locating instrumentalities at the will of the operator.

27. In a machine of the class described, a boring tool, last supporting means arranged for transverse movement for approximately centering lasts relatively to said tool, means for positioning the lasts in the same non-central geometrical longitudinal relation to said tool, and lateral contact members constructed and arranged to complete the transverse positioning of said lasts relatively to said tool.

28. In a machine of the class described, a boring tool, a last carrying member arranged for transverse movement to permit centering lasts relatively to said tool, and calipering members co-operating independently thereof for automatically positioning lasts of different lengths in the same longitudinal non-central geometrical relation to said tool.

29. In a machine of the class described, the combination with a boring tool, of calipering members for engaging the ends of successive lasts and automatically movable to position them in uniform longitudinal geometrical relation to said tool, and yieldable means for engaging the sides of the cones of said lasts for positioning them in transverse relation to said tool.

30. In a machine of the class described, boring means, a contacting member movable to approximately center the work transversely relatively thereto and contact members for completing the transverse positioning of the lasts.

31. In a machine of the class described, boring means, a carrier for approximately centering lasts transversely relatively thereto and means movable downwardly over the cone for completing the transverse positioning of the lasts, in co-operation with means for longitudinally positioning them relatively to the boring means.

32. In a machine of the class described, boring means, clamping mechanism for positioning the last longitudinally relatively to the boring means, and feeler mechanism for positioning it laterally relatively to the boring means, constructed and arranged to complete one adjustment after the completion of the other.

33. In a machine of the class described, boring means, moving feeler mechanism for positioning the last longitudinally relatively to the boring means, cone contacting mechanism for positioning it laterally relatively to the boring means, and an actuating means for the mechanisms having a lost motion connection with one whereby its action may be effected before the completion of the action of the other.

34. In a machine of the class described, the combination with a boring tool, of calipering means for engaging the ends of successive lasts and automatically operable to move them into uniform longitudinal relation to said tool, a carrier movable transversely of said calipering means, and yieldable fingers on said carrier for engaging the cones of said lasts to position them transversely with relation to said tool.

35. In a machine of the class described, the combination with a boring tool, of calipering fingers for engaging the ends of successive lasts and automatically operable to position them in a uniform longitudinal relation to said tool, said relation having a geometrical component, a carrier movable transversely of said calipering means, and yieldable transverse last-positioning means and last clamping means supported by said carrier.

36. In a machine of the class described, the combination with a boring tool, of means for supporting a last in position to have a hole bored by said tool in uniform non-central geometrical position in lasts of varying sizes, said means being adjustable in order that the hole will be bored at a desired angle with a base line of the last.

37. In a machine of the class described, the combination with a tool, of a forked last support arranged to support the last in the fork and slide horizontally transversely to the axis of the last, cone grasping fingers arranged to move downward upon the cone to aline it with the tool irrespective of the shape of the lower part of the heel, and a secondary support which is adjustable to level successive lasts with relation to the tool.

38. In a machine of the class described, the combination with a boring tool, of transversely adjustable means for supporting and moving the heel of the last relatively to said tool and transversely movable cone engaging fingers moving in alinement with the tool to position the cone by permissive movement of the said supporting means, to aline the cone of the last with the boring tool irrespective of the shape of the lower part of the heel, and vertically adjustable means for supporting the forepart of the last to enable lasts of different rises of heel to be placed in desired angular relation to the boring tool.

39. In a machine of the class described, the combination with a boring tool, of means for supporting lasts longitudinally in uniform non-central geometric relation to said tool, means for supporting the lasts transversely, and adjustable means for leveling successive lasts to insure boring the spindle holes perpendicular to a base line.

40. In a machine of the class described, the combination of a boring tool, gripping means for engaging opposite ends of a last and moving it into position relatively to the tool, transversely movable means for engaging the sides of the last to permit preliminary and final adjustment transversely of the tool, means for engaging the sides of the cone of the last for accurately adjusting it transversely after the preliminary adjustment, and adjustable means for supporting the forepart to level the last with respect to said tool.

41. In a machine of the class described, the combination with a boring tool, of means for measuring successive lasts of the same style and positioning them in uniform longitudinal non-central geometrical and transverse relation to said tool, supporting means for the heel end of the last, and vertically adjustable supporting means for the forepart constructed and arranged to level successive lasts so that the spindle holes will be perpendicular to base lines thereof.

42. In a machine of the class described, the combination with a tool for drilling holes transversly through the sides of lasts, of means comprising positioning members arranged to approach one another at different speeds along a dimension of the last for automatically positioning the said dimension of all lasts in the same relation, having a geometric component, to said tool, and an adjusting means for said first-named means for altering the normal action of said positioning members to introduce a non-arithmetical component into the said relation.

43. In a machine of the class described, the combination with a tool for boring last spindle holes, of a tool for boring holes through the sides of lasts in front of the said spindle holes, and means comprising last gripping fingers adjustable at will for positioning all lasts of the same style in uniform non-central geometric relation to either one of said tools as desired.

44. In a machine of the class described, the combination with a tool for boring spindle holes in lasts, of a tool movable transversely of the first-named tool and in a different vertical plane, and arranged to drill holes in the sides of lasts, and means comprising last gripping fingers for positioning all lasts of the same style in the same non-central, geometrical longitudinal relation to a selected one of said tools at will.

45. In a machine of the class described, the combination with a boring tool, of means for moving successive lasts into the same longitudinal relation to said tool, means for positioning the lasts transversely relatively to said tool, a treadle having yielding connection with the longitudinal last positioning means and constructed and arranged to actuate said means in advance of the transverse positioning means, and means for restoring the longitudinal last moving means to its original position when the treadle is released.

46. In a machine of the class described, the combination with devices for gripping the opposite ends of a last, slides movable in opposite directions and supporting said devices constructed and arranged to carry the last into a predetermined position, a treadle, yielding means between said treadle and slides to cause said slides and gripping means to move toward the toe and heel ends of a last when the treadle is depressed, and transverse last positioning means actuated through connections with said treadle.

47. In a machine of the class described, the combination with a boring tool, guiding fingers for moving successive lasts into the same longitudinal and transverse relation to said tool, means for advancing the tool to bore a spindle hole in a last, a treadle and connections for actuating said last moving means and for controlling the operation of the tool advancing means.

48. In a machine of the class described, means for boring a plurality of holes in a last, grasping members and operating mechanism therefor for presenting lasts to the boring means in such manner that any desired point related to the plurality of holes, considered as a system, will be geometrically and non-centrally placed in the lasts irrespective of their size.

49. In a machine of the class described, a work treating means, and work positioning means comprising contact members operable to grasp the work, said contact members being movable in non-central geometric relation to the work treating means whereby the hole bored by said means will be located in the same geometric relation to the points of contact of said members, irrespective of the absolute separation of said members.

50. In a machine of the class described, a boring means, a last grasping mechanism and a slide on which said mechanism is mounted arranged transversely of the longitudinal dimension of the last whereby the last may be carried laterally into approximate operative relation to the boring means, and a cone grasping means constructed and arranged to complete the last positioning.

51. A work positioning means comprising members constructed and arranged to engage the extremities of a dimension of the work, and place it in position with a point of the work non-centrally geometrically determined in relation to the said dimension in registration with a predetermined point, irrespective of the magnitude of the said dimension.

52. A work positioning means comprising members arranged to move in opposite directions at a constant velocity ratio other than unity and to grasp an article at the extremities of a dimension, whereby articles differing in said dimension may be positioned with a point geometrically related to the dimension in registration with a predetermined point.

53. A work positioning means comprising members arranged to move in opposite directions at a velocity ratio other than unity and to grasp an article at the extremities of a dimension, whereby articles differing in said dimension may be positioned with a point geometrically related to the dimension in registration with a predetermined point between said members.

54. A work positioning means comprising members constructed and arranged to engage the work in reference to one of its dimensions and place it in position with a point of the work non-centrally geometrically determined in relation to the said dimension in registration with a predetermined point, irrespective of the magnitude of the said dimension, one of said members having an independent adjustment to compensate for an arbitrary variation from standard (positive or negative) in the said dimension, which it is desired should not affect the positioning.

55. A work positioning means comprising members arranged to move in opposite directions at a velocity ratio other than unity and to grasp an article at the extremities of a dimension, whereby articles differing in said dimension may be positioned with a point geometrically related to the dimension in registration with a predetermined point, one of said members having an independent adjustment to compensate for an arbitrary variation from standard (positive or negative) in the said dimension which it is desired should not affect the positioning.

56. A work positioning means comprising members constructed and arranged to engage the extremities of a dimension of the work, and place it in position with a point of the work non-centrally geometrically determined in relation to the said dimension in registration with a predetermined point, irrespective of the magnitude of the said dimension, one of said members having an independent adjustment toward and from the other to compensate for an arbitrary variation from standard of fixed amount (positive or negative) in the said dimension, which it is desired should not affect the positioning.

57. In a machine of the class described, a boring means, movable work grasping members constructed and arranged to grasp work pieces of similar shape but differing absolutely in size and to move them into operative relation with the boring means in such manner as to insure the same non-central geometric relation between the boring means and the work pieces.

58. In a machine of the class described, a work treating means, a work holding instrumentality, and operating mechanism constructed and arranged to produce a relative movement between said means and instrumentalities to bring into registration the boring means and a point having the same non-central geometrical situation in work pieces of similar shape irrespective of absolute size.

59. In a machine of the class described, a boring means, and work holding fingers constructed and arranged to grasp the work and to locate the work and boring means relatively so that the said means registers with a point having a combined arithmetical and non-central geometrical relation to similar pieces of work, irrespective of their absolute dimensions.

60. In a machine of the class described, a boring means, feeler members constructed and arranged to contact with the work and to relatively locate the work and boring means with the boring means in registration with a point in the work having a combined arithmetical and non-central geometrical relation to the points of contact of the feeler members.

61. In a machine of the class described, a boring means, fingers for grasping the ends of a last, and operating mechanism for relatively moving the fingers and boring means to locate the boring means at a uniform arithmetical distance from a point which is at a uniform non-central geometrical distance from an end of the last.

In testimony whereof we have signed out names to this specification.

JOHN B. HADAWAY.
IRA C. BUCKMINSTER.